Patented May 23, 1944

2,349,779

UNITED STATES PATENT OFFICE 2,349,779

SYNTHESIS OF ARYL-ALKYL-HALOGENO-ETHANES

Gerrit John Van Zoeren, Holland, Mich., assignor to The Wm. S. Merrell Company, Cincinnati, Ohio, a corporation of Delaware No Drawing. Application October 12, 1940,
Serial No. 360,963

6 Claims. (Cl. 260—651)

The present invention relates to the synthesis of beta-aryl-beta-alkyl-alpha-halogeno ethanes in which the alkyl group has more than one carbon atom.

It has been known for some little time that allyl halides (e. g., $CH_2:CH.CH_2.Cl$) react with aromatic hydrocarbons (and their derivatives) in the presence of a condensing agent such as strong sulfuric acid to give, in the case of benzene, for example, beta-phenyl-beta-methyl-alpha-chloroethane, $C_6H_5.CH(CH_3).CH_2Cl$.

The above described reaction has not been tried on other unsaturated chloro-alkanes. Allyl-chloride contains a terminal methylene group and a primary halogen. It could not have been predicted that unsaturated halogeno alkanes not containing terminal methylene groups or having a secondary halogen atom would react similarly to allyl-chloride.

I have now discovered, however, that substances such as crotyl chloride do react with benzene and naphthalene and the alkyl substitution products thereof (e. g. toluene), and the halogen substitution products thereof (e. g. chloro-benzene) in the presence of a strong condensing agent, such for example as strong sulfuric acid and its equivalents, to give aralkyl-chloro-ethanes.

I have also discovered that methyl-vinyl-carbinyl-chloride, a secondary unsaturated chloride, $CH_3.CHCl.CH:CH_2$ reacts with benzene to produce the same product and it is probable, therefore, although I cannot yet give the explanation as final, that the reaction occurs as a consequence of a spontaneous rearrangement in one or both of these compounds. It is interesting, however, and surprising, that the reaction product in both cases apparently corresponds to that from crotyl chloride so that the resulting product apparently has the structure $C_6H_5CH(C_2H_5)CH_2Cl$.

This fact that apparently the same product results from the reaction of the crotyl chloride and the methyl-vinyl-carbinyl chloride is an advantage, since in the production of crude crotyl halides the reaction product is found to be a mixture of the crude crotyl halide and methyl-vinyl-carbinyl halide. Thus it is possible to use this crude reaction product for the purposes of my invention without the necessity of separation.

I am giving below certain specific examples of my invention and its application in practical use and I am giving also certain modifications and alternatives, but it is understood that these are not intended to be exhaustive or limiting of the invention. On the contrary, I am giving these as illustrations and am giving herewith explanations in order fully to acquaint others skilled in the art with my invention and the principles thereof and a suitable manner of its application in practical use so that others skilled in the art may be able to modify the invention to adapt it and apply it in numerous embodiments each as may be best suited to the requirements of a particular use.

One hundred parts by weight of technical (90%) crotyl chloride is mixed with an excess (300 to 500 parts by weight) of technical benzene. This mixture is agitated vigorously and cooled in a bath while maintaining the temperature preferably below 20° C. Strong sulfuric acid is added in an amount approximately equal to that of the chloride taken and of a purity close to 100%. The reaction is allowed to proceed preferably about ten hours. The mixture is subsequently allowed to stratify and the lower black sulfuric layer is discarded. The oil layer is treated with water and subjected to steam distillation until the recovery of unreacted benzene and reaction product is practically complete.

The oily distillate is separated from the water and distilled at first under atmospheric pressure (to recover most of the benzene) and then preferably under reduced pressure. The reaction product, presumably beta-phenyl-beta-ethyl-alpha-chloroethane, is obtained in a yield in excess of 30% of the theoretical, boiling at 112–114° C. at about 20 mm. pressure.

In an analogous manner substantially pure methyl-vinyl-carbinyl chloride or pure crotyl chloride may be used and will give a chloride boiling at the same temperature and the same pressure, indicating that in this case also the produce was the same.

Other halides homologous with crotyl chloride may be used to form the isomeric halogeno pentanes, hexanes, etc., in the same manner.

As stated before, the homologues and substituted derivatives of benzene and naphthalene react also in the same manner. The term sulfuric acid as used herein includes oleum also. Other condensing agents can be used in this as in the known reactions, but are not to be recommended, since sulfuric acid is ordinarily cheaper and more satisfactory.

What I claimed is:

1. The process for the synthesis of phenyl-ethyl-chloro-ethane which comprises mixing crotyl chloride with benzene in the presence of strong sulfuric acid, and separating phenyl-ethyl-chloro-ethane.

2. The process for the synthesis of phenylethyl-chloroethane which comprises mixing methyl-vinyl-carbinyl chloride (CH₃CHCl.CH:CH₂)

with benzene in the presence of strong sulfuric acid, and separating phenyl-ethyl-chloro-ethane.

3. The process for synthesis of phenyl-ethyl-chloro-ethane which comprises mixing benzene with a crude crotyl chloride containing methyl-vinyl-carbinyl chloride (CH₃CHClCH:CH₂) in the presence of strong sulfuric acid, and separating phenyl-ethyl-chloro-ethane.

4. The process for the synthesis of aralkyl-halogeno-ethane which comprises mixing crotyl halide with a substance of the class consisting of benzene and naphthalene, the alkyl substitution products thereof, and the halogen substitution products thereof, in the presence of strong sulfuric acid, and separating the aralkyl-halogeno-ethane.

5. The process for the synthesis of aralkyl-halogeno-ethane which comprises mixing methyl-vinyl-carbonyl halide with a substance of the class consisting of benzene and naphthalene, the alkyl substitution products thereof, and the halogen substitution products thereof, in the presence of strong sulfuric acid, and separating the aralkyl-halogeno-ethane.

6. The process for the synthesis of aralkyl-halogeno-ethane which comprises mixing a crude crotyl halide containing a methyl-vinyl-carbonyl halide with a substance of the class consisting of benzene and naphthalene, the alkyl substitution products thereof, and the halogen substitution products thereof, in the presence of strong sulfuric acid, and separating the aralkyl-halogeno-ethane.

G. JOHN VAN ZOEREN.